(12) United States Patent
Nagayasu et al.

(10) Patent No.: US 8,844,592 B2
(45) Date of Patent: Sep. 30, 2014

(54) PNEUMATIC TIRE

(75) Inventors: Masaaki Nagayasu, Hiratsuka (JP);
Yoshimasa Hashimoto, Hiratsuka (JP);
Hiroshi Furusawa, Hiratsuka (JP);
Kenichirou Endou, Tokyo (JP); Kenichi Sato, Tokyo (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 604 days.

(21) Appl. No.: 13/109,167

(22) Filed: May 17, 2011

(65) Prior Publication Data

US 2012/0118454 A1 May 17, 2012

(30) Foreign Application Priority Data

Nov. 15, 2010 (JP) ................................. 2010-255069
Nov. 18, 2010 (JP) ................................. 2010-027743
Apr. 12, 2011 (JP) ................................. 2011-088033

(51) Int. Cl.
*B60C 11/11* (2006.01)
*B60C 11/03* (2006.01)
*B60C 11/12* (2006.01)

(52) U.S. Cl.
CPC ..... *B60C 11/0304* (2013.04); *B60C 2011/0381* (2013.04); *B60C 11/12* (2013.01); *B60C 2011/0372* (2013.04); *B60C 11/0306* (2013.04); *B60C 2011/1213* (2013.04); *B60C 11/1236* (2013.04)
USPC .................................. 152/209.18; 152/209.8

(58) Field of Classification Search
CPC ............ B60C 2011/0374; B60C 11/03; B60C 11/0304; B60C 11/0306; B60C 11/11; B60C 11/12; B60C 11/1236; B60C 2011/0372; B60C 2011/0381; B60C 2011/1213; B60C 2011/0358
USPC ......... 152/209.1, 209.8, 209.15, 209.18, 902; D12/557–567, 525–532, 592–603
See application file for complete search history.

(56) References Cited

U.S. PATENT DOCUMENTS 4,262,720 A * 4/1981 Hanke ......................... 152/209.1
4,279,283 A * 7/1981 Hitzky ........................ 152/209.1
5,501,258 A * 3/1996 Sulkowski ................. 152/209.5

FOREIGN PATENT DOCUMENTS

JP 2009-96220 A 5/2009

* cited by examiner

*Primary Examiner* — Eric Hug
(74) *Attorney, Agent, or Firm* — Global IP Counselors, LLP

(57) ABSTRACT

A pneumatic tire improved in on-ice performance and on-snow performance in good balance. The pneumatic tire includes a tread portion extending in a tire circumferential direction and forming a ring shape, a pair of sidewall portions on both sides of the tread portion, respectively, and a pair of bead portions on inner sides of the sidewall portions in a tire radial direction, respectively. The tread portion includes a plurality of longitudinal grooves extending in the tire circumferential direction and a plurality of lateral grooves extending in a tire width direction. The longitudinal and lateral grooves define a plurality of block rows each including a plurality of blocks. Each of the plurality of blocks included in at least one of the block rows includes at least three closed grooves including at least one first closed groove and at least one second closed groove.

19 Claims, 14 Drawing Sheets

PNEUMATIC TIRE

CROSS-REFERENCE TO RELATED APPLICATIONS

This application claims priority to Japanese Patent Application No. JP2010-255069, filed on Nov. 15, 2010, Japanese Design Application No. JP2010-027743, filed on Nov. 18, 2010 and Japanese Patent Application No. JP2011-088033, filed on Apr. 12, 2011. The entire disclosures of Japanese Patent Application No. P2010-255069, Japanese Design Application No. JP2010-027743 and Japanese Patent Application No. JP2011-088033 are hereby incorporated herein by reference.

BACKGROUND

1. Field of the Invention

The present invention relates to a pneumatic tire suitable for winter use, and more specifically relates to a pneumatic tire that has improved on-ice performance and on-snow performance and good balance.

2. Background Information

A pneumatic tire for winter use such as a studless tire conventionally has the following configuration. Multiple longitudinal grooves extending in a tire circumferential direction and multiple lateral grooves extending in a tire width direction are provided in a tread portion, and these longitudinal and lateral grooves define multiple blocks. Multiple sipes extending in the tire width direction are provided in each of the blocks (see Japanese patent application Kokai publication No. 2009-96220, for example).

Such a pneumatic tire for winter use requires both on-ice performance and on-snow performance. Generally, when the on-ice performance is to be improved, such a tread pattern is used that a ratio of groove area in the tread portion is reduced to increase an actual contact area. However, merely reducing the ratio of groove area in the tread portion causes reduction in on-snow performance. In other words, there is a trade-off relationship between the on-ice performance and the on-snow performance, and it is extremely difficult to achieve both performances in good balance.

SUMMARY

An object of the present invention is to provide a pneumatic tire improved in on-ice performance and on-snow performance in good balance.

A pneumatic tire according to a disclosed embodiment to achieve the above object includes: a tread portion extending in a tire circumferential direction and forming a ring shape; a pair of sidewall portions disposed on both sides of the tread portion, respectively; and a pair of bead portions disposed on inner sides of the sidewall portions in a tire radial direction, respectively, the tread portion being provided with a plurality of longitudinal grooves extending in the tire circumferential direction and a plurality of lateral grooves extending in a tire width direction, the longitudinal grooves and the lateral grooves defining a plurality of block rows each including a plurality of blocks. In the pneumatic tire, each of the plurality of blocks included in at least one of the block rows is provided with at least three closed grooves including at least one first closed groove and at least one second closed groove, the first closed groove having one end opened to one of the longitudinal grooves adjacent to the block and having the other end closed in the block, the second closed groove having one end opened to the other one of the longitudinal grooves adjacent to the block and having the other end closed in the block, and for each of the blocks provided with the closed grooves, two or more different angles are set as inclined angles of the closed grooves with respect to the tire width direction.

In a disclosed embodiment, in each of the multiple blocks included in at least one of the block rows, at least three closed grooves each having one end thereof closed are provided instead of a lateral groove which extends in the tire width direction and which divides the block into smaller pieces. Generally, when the number of lateral grooves dividing the blocks into smaller pieces is increased to improve an on-snow performance, block stiffness is reduced and a driving stability on dry and wet road surfaces is reduced. Moreover, an on-ice braking performance tends to be reduced due to reduction in a contact area. However, when the aforementioned closed grooves are provided, the on-snow performance can be improved while avoiding reduction in driving stability on dry and wet road surfaces due to reduction in block stiffness, and avoiding reduction in on-ice braking performance due to reduction in the contact area. As a result, the on-ice performance and the on-snow performance can be improved in good balance in a pneumatic tire for winter use such as a studless tire.

Moreover, two or more different angles are set as inclined angles of the closed grooves with respect to the tire width direction for each of the blocks. Thus, there are two or more collapsing directions of the block in one block, and portions where the collapsing occurs support each other. Accordingly, this structure increases the block stiffness. Furthermore, when two or more different angles are set as the inclined angles of the closed grooves with respect to the tire width direction for each of the blocks, driving stability in cornering on snow can be improved.

In a disclosed embodiment, an inclination direction of the first closed groove and an inclination direction of the second closed groove with respect to the tire width direction are preferably different from each other in each of the blocks provided with the closed grooves. This configuration secures sufficient block stiffness. Thus, reduction in driving stability on dry and wet road surfaces can be prevented. Furthermore, reduction in on-ice performance due to collapsing of the blocks can be prevented.

In a disclosed embodiment, it is preferable that the closed grooves be provided in each of a plurality of blocks included in a block row located between a block row in a tire shoulder and a block row on a tire equator among the block rows, at least one groove being the first closed groove be disposed on a shoulder side in each of the blocks provided with the closed grooves, and at least two grooves each being the second closed groove be disposed on a tire equator side in each of the blocks provided with the closed grooves. Generally, in a pneumatic tire, driving performance on snow is exhibited in a region on the tire equator side of the tread portion, and braking performance on ice is exhibited in regions on the shoulder sides of the tread portion. Thus, by disposing a relatively larger number of closed grooves on the tire equator side as described above, the driving performance on snow can be improved. Meanwhile, by disposing relatively smaller number of closed grooves on the shoulder sides, the block stiffness is secured and the on-ice braking performance is improved.

When at least two second closed grooves are disposed on the tire equator side in each of the blocks provided with the closed grooves, it is preferable that a range of variation of the inclined angles of the second closed grooves with respect to the tire width direction be 10° or less. This configuration causes the snow caught by the second closed grooves to be discharged in the same direction. Thus, the snow discharging performance is improved, and the on-snow performance is improved.

An intersecting angle between the first closed groove and the second closed groove is preferably 110° or more and 170° or less in each of the blocks provide with the closed grooves. Thus, reduction in on-ice performance is avoided by suppressing reduction in block stiffness while driving stability in cornering on snow is improved.

In a disclosed embodiment, it is preferable that the closed grooves be provided in each of a plurality of blocks included in a block row adjacent to a block row in a tire shoulder among the block rows, and at least one of the closed grooves be disposed at such a position that the closed groove communicates with one of the lateral grooves defining the blocks of the block row in the tire shoulder. This improves the snow discharging performance, and thus improves the on-snow performance.

Moreover, in a disclosed embodiment, it is preferable that the closed grooves be provided in each of a plurality of blocks included in a block row adjacent to a block row on a tire equator among the block rows, and at least one of the closed grooves be disposed at such a position that the closed groove communicates with one of the lateral grooves defining the blocks of the block row on a tire equator. This improves the snow discharging performance, and thus improves the on-snow performance.

Preferably, a plurality of sipes extending in the tire width direction are provided in each of the plurality of blocks included in the plurality of block rows. Thus, on-ice performance preferable for a pneumatic tire for winter use is exhibited.

Here, when each of the blocks provided with the closed grooves is sectioned into at least three regions in the tire circumferential direction, inclined angles of the sipes with respect to the tire width direction are preferably set to be alternately different for the respective regions. Thus, driving stability in cornering on ice can be improved.

Moreover, it is preferable that in regions at both ends of each of the blocks provided with the closed grooves in the tire circumferential direction, a difference between an inclined angle of the sipes with respect to the tire width direction and an inclined angle of the lateral grooves defining the block with respect to the tire width direction be 10° or less, and, in a center region of each of the blocks provided with the closed grooves in the tire circumferential direction, a difference between an inclined angle of the sipes with respect to the tire width direction and an inclined angle of the closed groove with respect to the tire width direction be 10° or less, the closed groove inclined in a direction opposite to the inclination of the lateral grooves defining the block. The sipes can be arranged densely by optimizing the inclined angle of the sipes in accordance with the inclined angles of the lateral grooves and the closed grooves as described above. Thus, the on-ice performance can be improved.

A block pitch of the block row located closer to the tire equator than the block row in each of the tire shoulders is preferably twice as large as a block pitch of the block rows in the tire shoulder. This secures sufficient on-ice performance.

The disclosed embodiments are applicable to a pneumatic tire designed to be mounted on a vehicle in a way that either side of the tire faces to an outside of the vehicle. However, the disclosed embodiments are also applicable to a pneumatic tire having such an asymmetrical tread pattern that the tire is mounted on a vehicle with a designated side of the tire facing an outside of the vehicle. When the pneumatic tire has such an asymmetrical tread pattern that the tire is mounted on a vehicle with a designated side of the tire facing an outside of the vehicle, the closed grooves are preferably provided in each of a plurality of blocks included in a block row located on an inner side of the vehicle relative to the block row on the tire equator. Thus, the on-snow performance can be improved based on the closed grooves formed in the blocks of the block rows located on an inner side of the vehicle, while the stiffness of the blocks on the outer side of the vehicle is not reduced.

In a disclosed embodiment, the closed groove is defined as a groove whose maximum groove width is 2 mm or more and 10 mm or less (preferably, 3 mm or more and 7 mm or less) and whose maximum groove depth is 5 mm or more and 10 mm or less. Meanwhile, the sipe is defined as a groove whose groove width is 1 mm or less. Moreover, the closed groove is a groove whose end portion is closed in the block. However, it is acceptable that a sipe with a width of 1 mm or less communicates with the closed end portion. Such a sipe with narrow width does not substantially deteriorate the effects obtained by closing the grooves.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
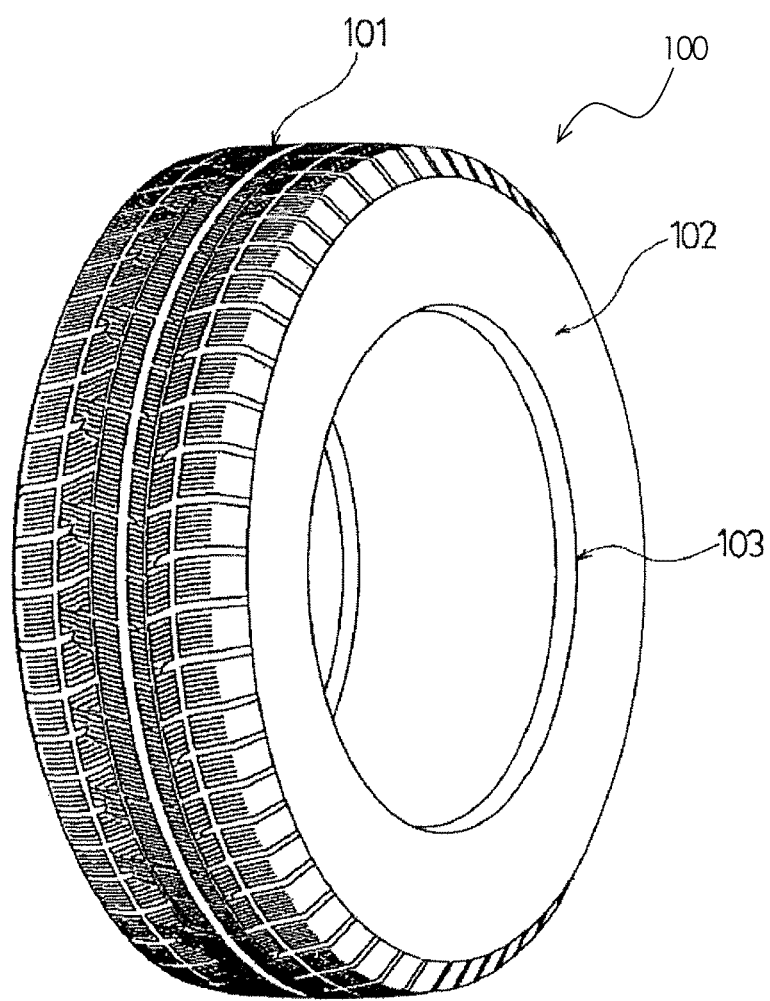
FIG. 1 is a perspective view showing a pneumatic tire of a disclosed embodiment.
Figure 2:
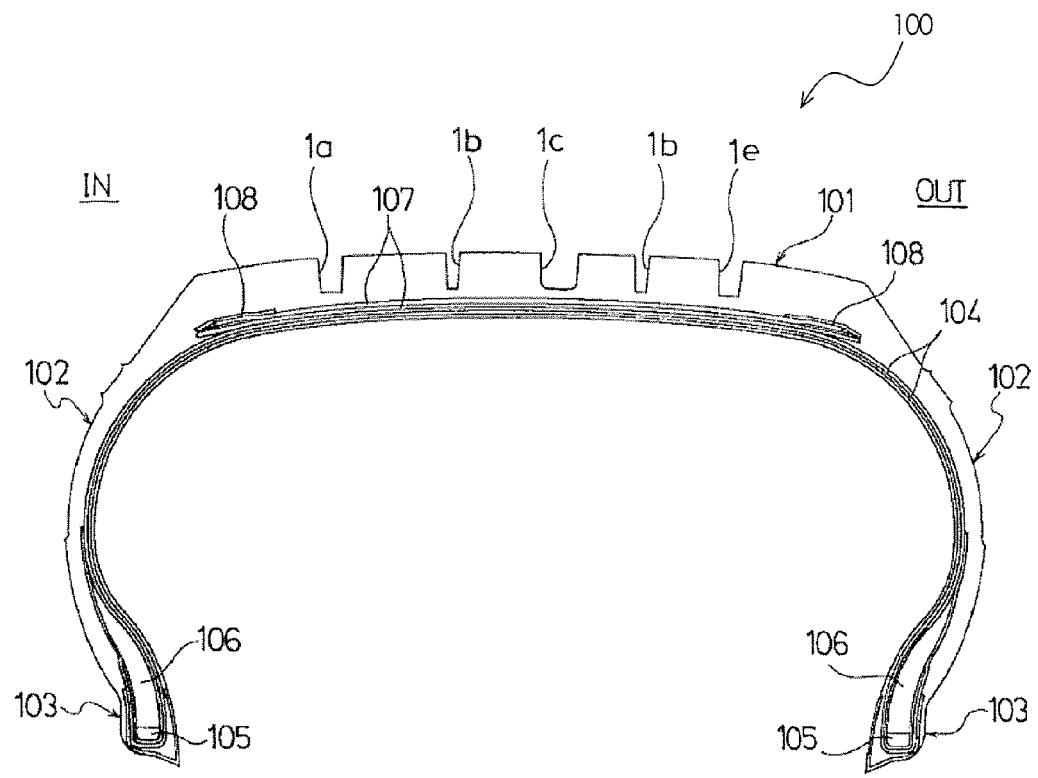
FIG. 2 is a meridian cross-sectional view showing the pneumatic tire of a disclosed embodiment.

A configuration of a disclosed embodiment will be described below in detail with reference to the attached drawings. FIGS. 1 and 2 show a pneumatic tire of an embodiment of the present invention. As shown in FIGS. 1 and 2, the pneumatic tire of the embodiment includes a tread portion 101 extending in a tire circumferential direction and having a ring shape, a pair of sidewall portions 102 respectively disposed on both sides of the tread portion 101, and a pair of bead portions 103 respectively disposed on inner sides of the sidewall portions 102 in a tire radial direction.

Two carcass layers 104 are installed extending from one bead portion 103 to the other bead portion 103. Each of these carcass layers 104 includes multiple reinforcement cords extending in the tire radial direction, and is folded back around a bead core 105 from the inner side to the outer side of the tire, the bead core 105 being provided in each of the bead portions 103. A bead filler 106 having a triangular cross section and being made of a rubber composition is disposed on an outer circumference of each of the bead core 105.

Multiple belt layers 107 are embedded in the tread portion 101 at a portion on the outer circumference side of the carcass layers 104. These belt layers 107 include multiple reinforcement codes inclined with respect to the tire circumferential direction. The reinforcement codes in one layer are disposed so as to intersect with the reinforcement codes in another layer. In the belt layers 107, angles at which the reinforcement codes are inclined with respect to the tire circumferential direction is set within a range of, for example, 10° to 40°. At least one belt cover layer 108 is disposed on an outer circumference side of the belt layers 107. The belt cover layer 108 is provided to improve a high-speed durability, and includes reinforcement codes arranged at an angle of, for example, 5° or less with respect to the tire circumferential direction.

Note that, the tire internal configuration of the tire described above is a typical example of a pneumatic tire, and the invention is not limited to this configuration.

Figure 3:
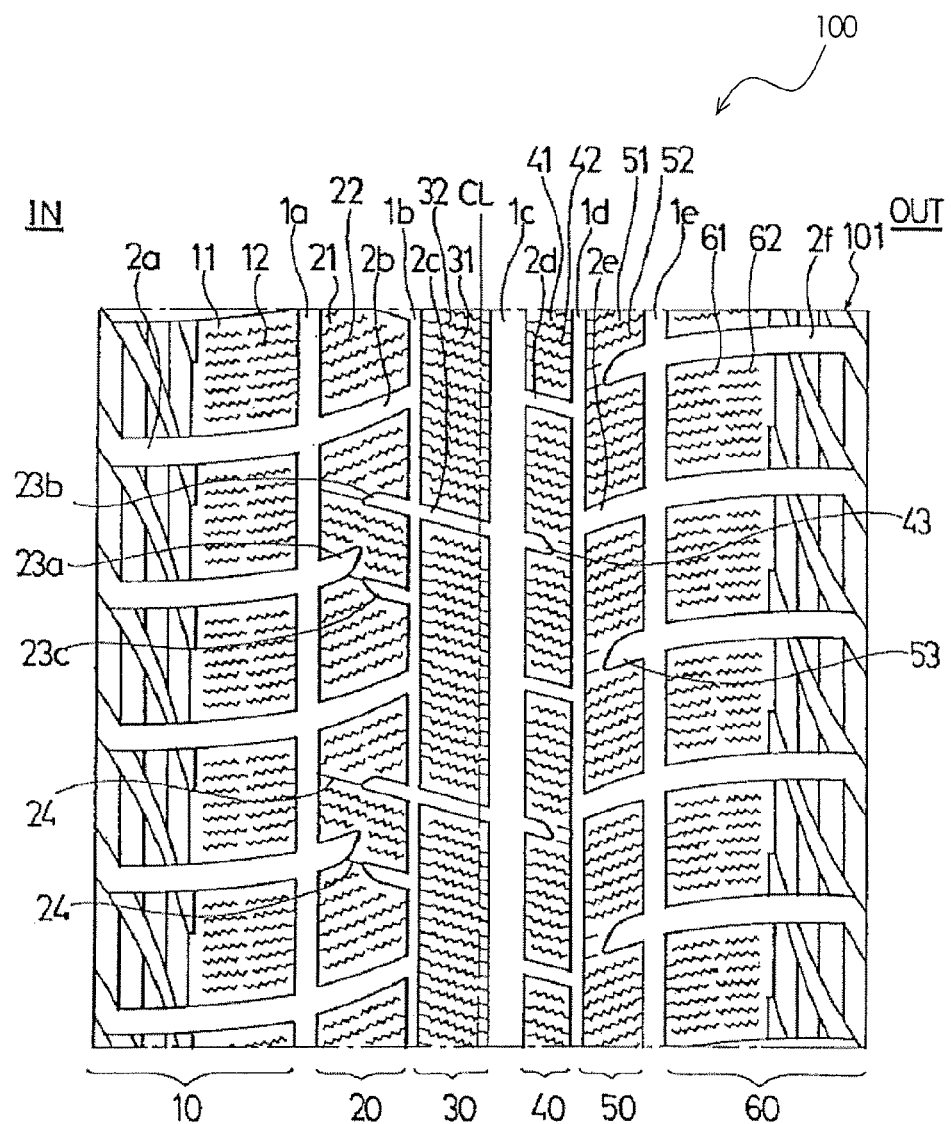
FIG. 3 is a detailed view showing a tread pattern of the pneumatic tire (Example 1) of a disclosed embodiment with the tread pattern continuously repeating around the circumference of the tire.
Figure 4:
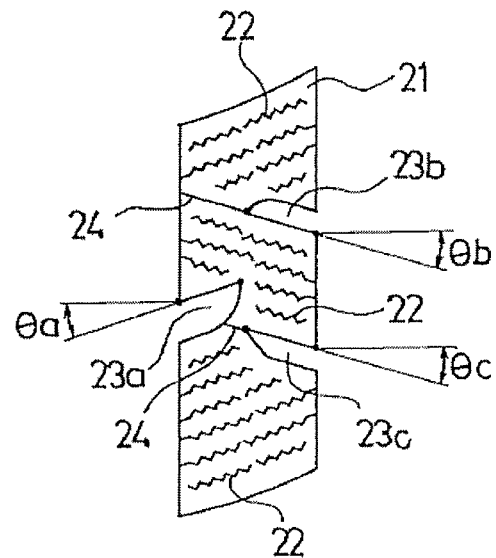
FIG. 4 is a partial plan view showing a main portion of the tread pattern of the pneumatic tire of FIG. 3 in enlarged manner.
Figure 5:
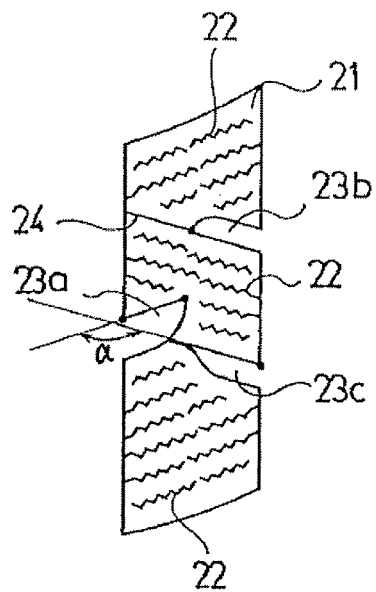
FIG. 5 is a partial plan view showing a main portion of the tread pattern of the pneumatic tire of FIG. 3 in an enlarged manner.
Figure 6:
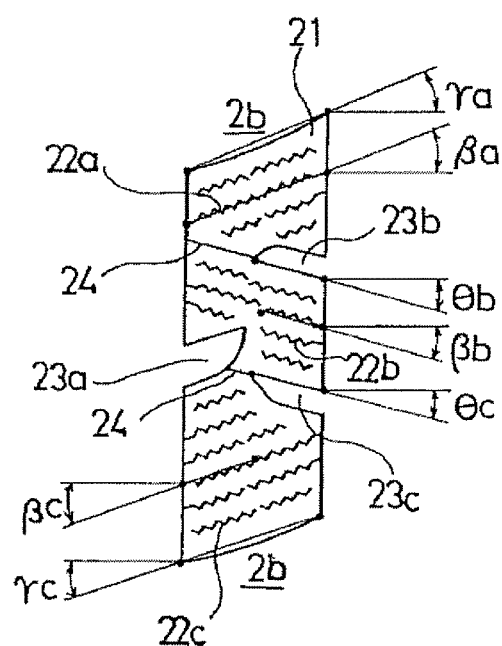
FIG. 6 is a partial plan view showing a main portion of the tread pattern of the pneumatic tire of FIG. 3 in enlarged manner.

FIG. 3 shows a tread pattern of the pneumatic tire of the embodiment of the present invention. FIGS. 4 to 6 each show a main portion of the tread pattern. The pneumatic tire of this embodiment has such an asymmetrical tread pattern that the tire is to be mounted on a vehicle with a designated side thereof facing an outside of the vehicle. IN indicates an inner side of a vehicle and OUT indicates an outer side of the vehicle.

As shown in FIG. 3, multiple longitudinal grooves 1a, 1b, 1c, 1d, and 1e extending in the tire circumferential direction and multiple lateral grooves 2a, 2b, 2c, 2d, 2e, and 2f extending in a tire width direction are formed in the tread portion 101. Multiple block rows 10, 20, 30, 40, 50, and 60 are defined by the longitudinal grooves 1a to 1e and the lateral grooves 2a to 2f, in this order from the inner side of the vehicle to the outer side of the vehicle. The width and depth of each of the longitudinal grooves 1 are not particularly limited. However, the width is set within a range of 2 mm to 13 mm, and the depth is set within a range of 8 mm to 10 mm, for example.

The block row 10 positioned in a tire shoulder on the inner side of the vehicle includes multiple blocks 11 defined by the longitudinal groove 1a and the lateral grooves 2a. Multiple sipes 12 extending in the tire width direction and each having a zigzag shape on a tread surface are formed in each block 11.

The block row 20 adjacent to the block row 10 includes multiple blocks 21 defined by the longitudinal grooves 1a, 1b and the lateral grooves 2b. Multiple sipes 22 extending in the tire width direction and each having a zigzag shape on a tread surface are formed in each block 21. Moreover, three closed grooves 23a, 23b, 23c are formed in each block 21. One end of the closed groove 23a (first closed groove) is opened to the longitudinal groove 1a adjacent to the block 21, and the other end thereof is closed in the block 21. One end of each of the closed grooves 23b, 23c (second closed grooves) is opened to the longitudinal groove 1b adjacent to the block 21, and the other end thereof is closed in the block 21. Furthermore, two sipes 24 which extend in the tire width direction respectively from tips of the closed grooves 23b, 23c and which have a linear shape on the tread surface are formed in each block 21. Moreover, in each block 21, two or more different angles are set as inclined angles of the closed grooves 23a to 23c with respect to the tire width direction.

Specifically, as shown in FIG. 4, two or more different angles are set as inclined angles θa, θb, θc of the respective closed grooves 23a to 23c with respect to the tire width direction. The inclined angles θa to θc are each preferably set within a range of 10° to 45° or within a range of −10° to −45°. Note that, a positive value indicates an inclination in one direction, and a negative value indicates an inclination in the opposite direction. Moreover, the inclined angles θa to θc are each determined based on a straight line passing through both ends of the longer one of groove wall surfaces of the corresponding one of the closed grooves 23a to 23c.

The block row 30 positioned on a tire equator CL includes multiple blocks 31 defined by the longitudinal grooves 1b, 1c and the lateral grooves 2c. Multiple sipes 32 extending in the tire width direction and each having a zigzag shape on the tread surface are formed in each block 31.

The block row 40 adjacent to the block row 30 includes multiple blocks 41 defined by the longitudinal grooves 1c, 1d and the lateral grooves 2d. Multiple sipes 42 extending in the tire width direction and each having a zigzag shape on the tread surface are formed in each block 41. Moreover, one closed groove 43 is formed in each block 41. One end of the closed groove 43 is opened to the longitudinal groove 1c adjacent to the block 41, and the other end thereof is closed in the block 41.

The block row 50 adjacent to the block row 40 includes multiple blocks 51 defined by the longitudinal grooves 1d, 1e and the lateral grooves 2e. Multiple sipes 52 extending in the tire width direction and each having a zigzag shape on the tread surface are formed in each block 51. Moreover, one closed groove 53 is formed in each block 51. One end of the closed groove 53 is opened to the longitudinal groove 1e adjacent to the block 51, and the other end thereof is closed in the block 51.

The block row 60 positioned in a tire shoulder on the outer side of the vehicle includes multiple blocks 61 sectioned by the longitudinal groove 1e and the lateral grooves 2f. Multiple sipes 62 extending in the tire width direction and each having a zigzag shape on the tread surface are formed in each block 61.

In the pneumatic tire described above, at least the three closed grooves 23a to 23c having their one ends closed are provided in each of the multiple blocks 21 included in the block row 20. Hence, the pneumatic tire is improved in on-snow performance by surely griping a snow surface with the closed grooves 23a to 23c, while avoiding reduction in driving stability on dry and wet road surfaces due to reduction in stiffness of the blocks 21 and avoiding reduction in on-ice braking performance due to reduction in contact area.

Moreover, for each of the blocks 21, two or more different angles are set as inclined angles of the closed grooves 23a to 23c with respect to the tire width direction. Thus, there are two or more collapsing directions of the block 21 in one block, and portions where the collapsing occurs support each other. Accordingly, this structure increases the stiffness of the block 21. Furthermore, when two or more different angles are set as the inclined angles of the closed grooves 23a to 23c with respect to the tire width direction for each of the blocks 21, driving stability in cornering on snow can be improved.

In the pneumatic tire described above, in each block 21, an inclined direction of the first closed groove 23a and an inclined direction of the second closed grooves 23b, 23c with respect to the tire width direction are different from each other. Specifically, in FIG. 3, the first closed groove 23a rises from left to right, whereas the second closed grooves 23b, 23c rise from right to left. In this case, the block 21 has two or more collapsing directions which are opposite to each other with respect to the tire circumferential direction. Thus portions where collapsing occurs surely support each other, and the stiffness of the block 21 is effectively increased. For this reason, reduction in driving stability on dry and wet road surfaces can be prevented. Furthermore, reduction in on-ice performance due to collapsing of the blocks 21 can be prevented.

In the pneumatic tire described above, in each of the multiple blocks 21 included in the block row 20 positioned between the block row 10 in the tire shoulder and the block row 30 on the tire equator CL, the closed grooves 23a to 23c described above are formed, at least one first closed groove 23a is disposed on the shoulder side in the block 21, and at least two second closed grooves 23b, 23c are disposed on the tire equator CL side in the block 21. Thus, by disposing a relatively larger number of the closed grooves 23b, 23c on the tire equator CL side in each block 21 as described above, the driving performance on snow can be improved. Meanwhile, by disposing a relatively smaller number of the closed grooves 23a on the shoulder sides of each block 21, the stiffness of the block 21 is secured and the on-ice braking performance is improved.

When at least two second closed grooves 23b, 23c are disposed on the tire equator CL side in each block 21, a range of variation of the inclined angles θb, θc of the respective second closed grooves 23b, 23c with respect to the tire width direction is 10° or less (see FIG. 4). In other words, it is preferable that |θb−θc|≤10°. This configuration causes the snow caught by the second closed grooves 23b, 23c to be discharged in the same direction. Thus, the snow discharging performance is improved, and the on-snow performance is improved. Note that when the range of variation of the inclined angles θb, θc of the respective second closed grooves 23b, 23c is excessively wide, the effect of improving the snow discharging performance is insufficient.

As show in FIG. 5, in each block 21, an intersecting angle α between the first closed groove 23a and each of the second closed grooves 23b, 23c is preferably 110° or more and 170° or less. This configuration improves the driving stability in cornering on snow, while reduction in on-ice performance is avoided by suppressing reduction in stiffness of the block 21. A significant effect is obtained particularly when the intersecting angle α is 140° or more and 160° or less. If the intersecting angle α between the first closed groove 23a and each of the second closed grooves 23b, 23c is excessively small, the on-ice performance is reduced due to reduction in stiffness of the block 21. On the other hand, if the intersecting angle α is excessively large, the effect of improving the driving stability in cornering on snow is insufficient.

In the pneumatic tire described above, the closed grooves 23a to 23c are provided in each of the multiple blocks 21 included in the block row 20 adjacent to the block row 10 in the tire shoulder. In this case, as shown in FIG. 3, it is preferable to dispose at least one closed groove 23a at such a position that the closed groove 23a communicates with one of the lateral grooves 2a defining the blocks 11 of the block row 10 in the tire shoulder. This configuration allows the snow caught by the closed groove 23a to move to the lateral groove 2a. Thus, the snow discharging performance is improved, and the on-snow performance is improved.

Moreover, in the pneumatic tire described above, the closed grooves 23a to 23c are provided in each of the multiple blocks 21 included in the block row 20 adjacent to the block row 30 on the tire equator CL. In this case, as shown in FIG. 3, it is preferable to dispose at least one closed groove 23b at such a position that the closed groove 23b communicates with one of the lateral grooves 2c defining the blocks 31 of the block row 30 on the tire equator CL. This configuration allows the snow caught by the closed groove 23b to move to the lateral groove 2c. Thus, the snow discharging performance is improved, and the on-snow performance is improved.

In the pneumatic tire described above, the multiple sipes 12, 22, 32, 42, 52, and 62 extending in the tire width direction are provided in the blocks 11, 21, 31, 41, 51, and 61 to exhibit preferable on-ice performance. As for each of the blocks 21 provided with the closed grooves 23a to 23c, the sipes 22 are preferably disposed as follows. Specifically, it is preferable that, when the block 21 is sectioned into at least three regions in the tire circumferential direction, inclined directions of the sipes 22 with respect to the tire width direction are set to be alternately different for the respective regions. In FIG. 6, the block 21 in sectioned into three regions on the basis of extended lines of the closed grooves 23b, 23c, and the sipes 22a, 22b and 22c are disposed in these three regions such that inclined directions of the sipes 22a, 22b and 22c with respect to the tire width direction are set to be alternately different for the respective three regions. Thus, an edge effect is exhibited to forces from different directions on the basis of the sipes 22a to 22c inclined in different directions. Hence, the driving stability in corning on ice is improved.

Here the following configuration is preferable. In regions at both ends of each block 21 in the tire circumferential direction, the difference between an inclined angle βa, βc of the sipes 22a, 23c with respect to the tire width direction and an inclined angle γa, γc of the lateral grooves 2b with respect to the tire width direction is 10° or less, the lateral grooves 2b defining the block 21. In a center region of each block 21 in the tire circumferential direction, the difference between an inclined angle βb of the sipes 22b with respect to the tire width direction and an inclined angle θb (or θc) of the closed groove 23b (or 23c) with respect to the tire width direction is set to be 10° or less, the closed groove 23b inclined in a direction opposite to the inclination of the lateral grooves 2b defining the block 21. In other words, it is preferable that |βa−γa|≤10°, |βc−γc|≤10°, and |βb−θb|≤10° (or |βb−θc|≤10°).

When the inclined angles βa to βc of the sipes 22a to 22c are optimized in accordance with the inclined angles of the lateral grooves 2b and the closed groove 23b (or 23c) as described above, the sipes 22a to 22c can be arranged densely. Hence, the on-ice performance is improved. When the differences between the inclined angles described above are excessively large, it is difficult to densely arrange the sipes 22a to 22c. Note that, each of the inclined angles βa to βc is determined based on a straight line passing through both ends of the corresponding one of the sipes 22a to 22c. Moreover, each of the inclined angles γa and γc is determined based on a straight line passing through both ends of a groove wall surface of the corresponding one of the lateral grooves 2b.

In the pneumatic tire described above, a block pitch in the circumferential direction of each of the block rows 20, 30, 40, and 50 which are located closer to the tire equator CL than the block rows 10 and 60 in the tire shoulders is twice as large as that of each of the block rows 10 and 60 in the tire shoulders. In other words, dividing of the blocks 21, 31, 41, and 51 into small sections is avoided in a center region of the tread portion 101. Thus, sufficient on-ice performance is secured. In addition, sufficient driving stability on dry and wet road surfaces is secured.

Figure 7:
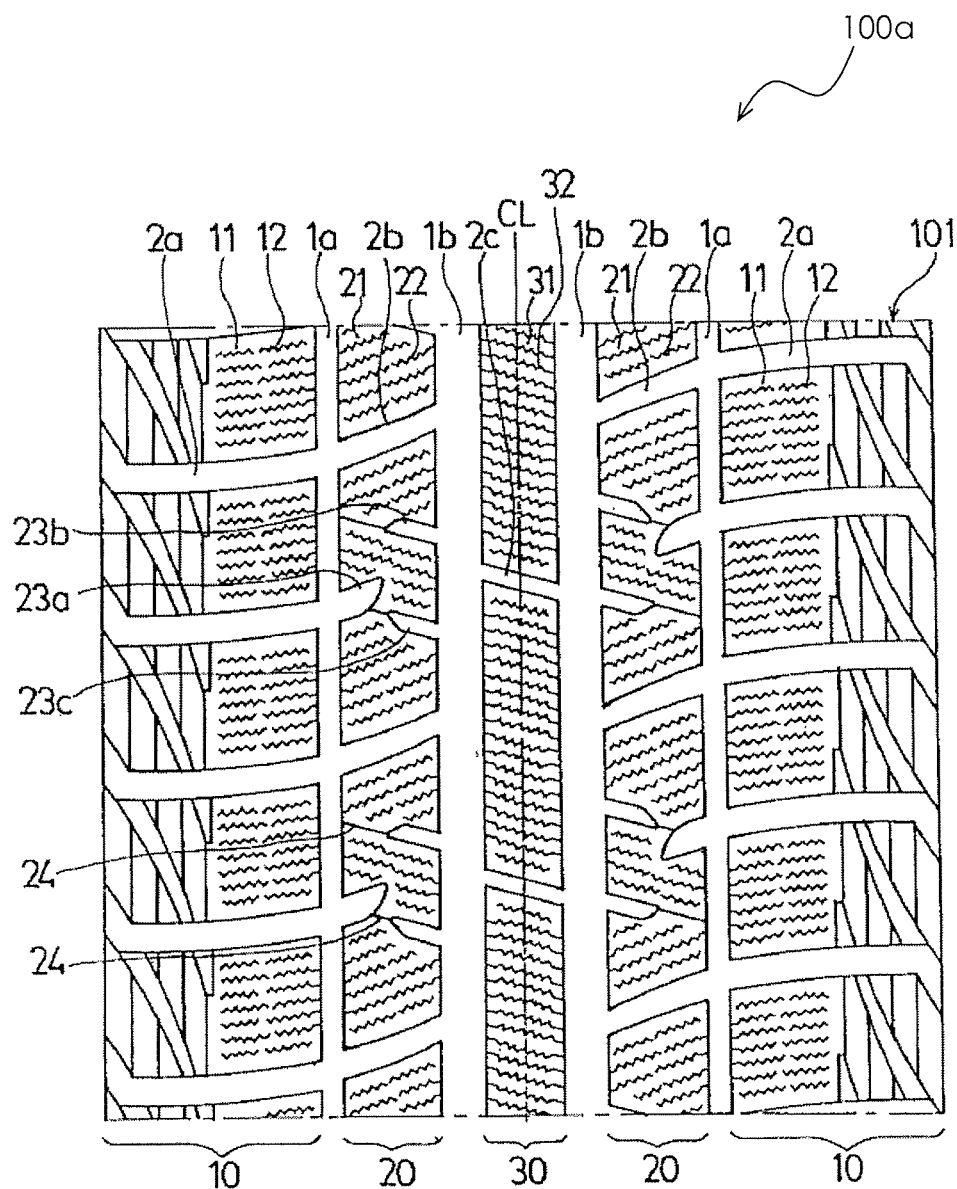
FIG. 7 is a detailed view showing a tread pattern of the pneumatic tire (Example 3) of another disclosed embodiment with the tread pattern continuously repeating around the circumference of the tire.

FIG. 7 shows a tread pattern of a pneumatic tire 100a of another embodiment of the present invention. The pneumatic tire 100a of this embodiment has such a tread pattern that the tire can be mounted on a vehicle with either side thereof facing an outside of the vehicle.

This embodiment is an embodiment in which the block rows 10, 20, and 30 of the embodiment shown in FIG. 3 are arranged substantially symmetrically with respect to the tire equator CL. In this case also, at least three closed grooves 23a to 23c each having one end closed are provided in each of multiple blocks 21 included in a block row 20. Accordingly, the pneumatic tire is improved in snow performance while avoiding reduction in driving stability on dry and wet road surfaces due to reduction in stiffness of the blocks 21 and avoiding reduction in on-ice braking performance due to reduction in contact area.

In each of the embodiments described above, a case where the aforementioned closed grooves are provided in blocks included in a certain block row is described. However, in any disclosed embodiment, the aforementioned closed grooves may be provided in blocks included in any block row. When at least three closed grooves are provided in any of the blocks, the on-snow performance can be improved by those closed grooves. Moreover, since there is no significant reduction in block stiffness, the driving stability on dry and wet road surfaces is substantially not reduced. In addition, since there is no significant reduction in block contact area, the on-ice performance is substantially not reduced.

Preferable embodiments of the present invention have been described above in detail. However, it should be understood that various modifications, substitutions, and replacements can be made on the embodiments as long as such modifications, substitutions, and replacements are made within the gist and scope of the present invention specified by the attached claims.

EXAMPLES

Pneumatic tires of Examples 1, 2 with the following configuration were prepared. Each pneumatic tire had a tire size of 215/60R16 and such an asymmetrical tire pattern that the tire was to be mounted on a vehicle with a designated side thereof facing an outside of the vehicle. A tread portion of each pneumatic tire was provided with multiple longitudinal grooves extending in a tire circumferential direction and multiple lateral grooves extending in a tire width direction, and the longitudinal grooves and the lateral grooves defined multiple block rows including multiple blocks. In each of the multiple blocks included in a block row located between a block row in a tire shoulder on the inner side of the vehicle and a block row on a tire equator, three closed grooves including one first closed groove and two second closed grooves were provided. Here, one end of the first closed groove was opened to a longitudinal groove which was adjacent to the block and located on the shoulder side, and the other end was closed in the block. Moreover, one end of each of the second closed grooves was opened to a longitudinal groove which was adjacent to the block and located on a tire equator side, and the other end was closed in the block. In each of the blocks provided with these closed grooves, inclined angles of the closed grooves with respect to the tire width direction were set such that there were two types of angles.

Figure 8:
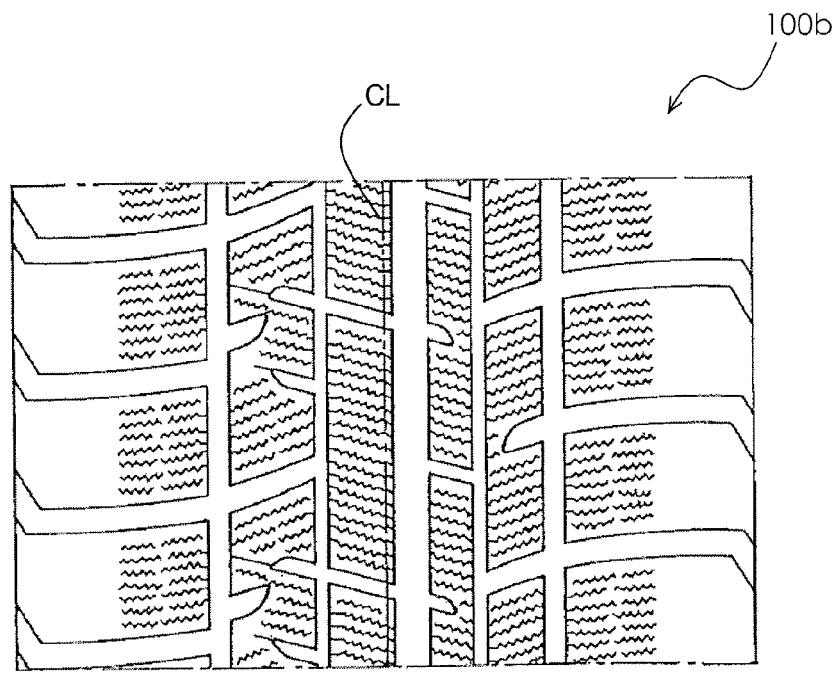
FIG. 8 is a detailed view showing a tread pattern of a test tire (Example 2)

The tire of Example 1 had the tread pattern shown in FIG. 3 where an inclined angle θa of the first closed groove 23a was −17°, and inclined angles θb, θc of the second closed grooves 23b, 23c were +15°. The tire 100b of Example 2 had a tread pattern shown in FIG. 8, and had the same configuration as Example 1 except that first closed grooves 23a were disposed at positions offset in the tire circumferential direction from lateral grooves 2a defining blocks 11 in a block row 10 in the tire shoulder.

Figure 10:
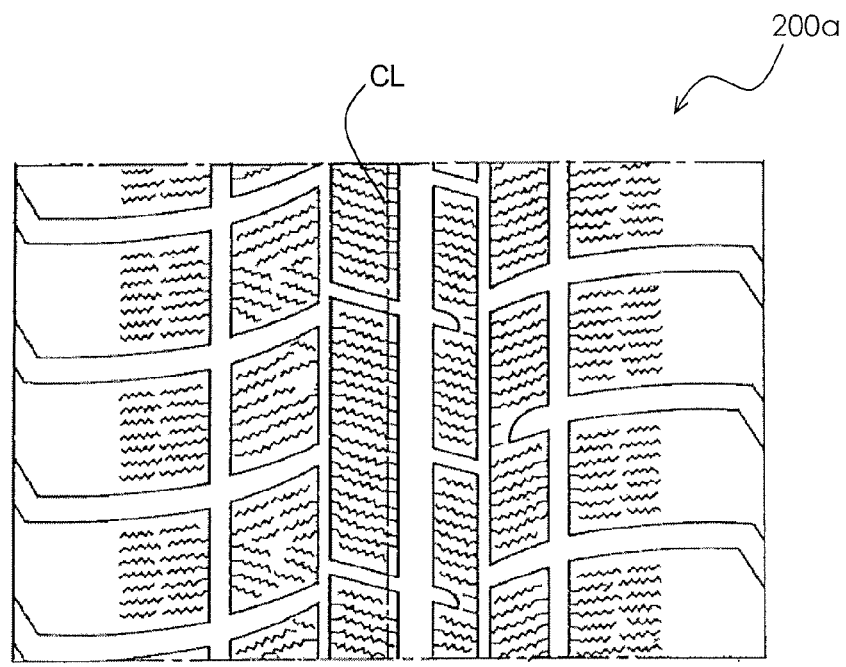
FIG. 10 is a detailed view showing a tread pattern of a test tire (Comparative Example 1)
Figure 11:
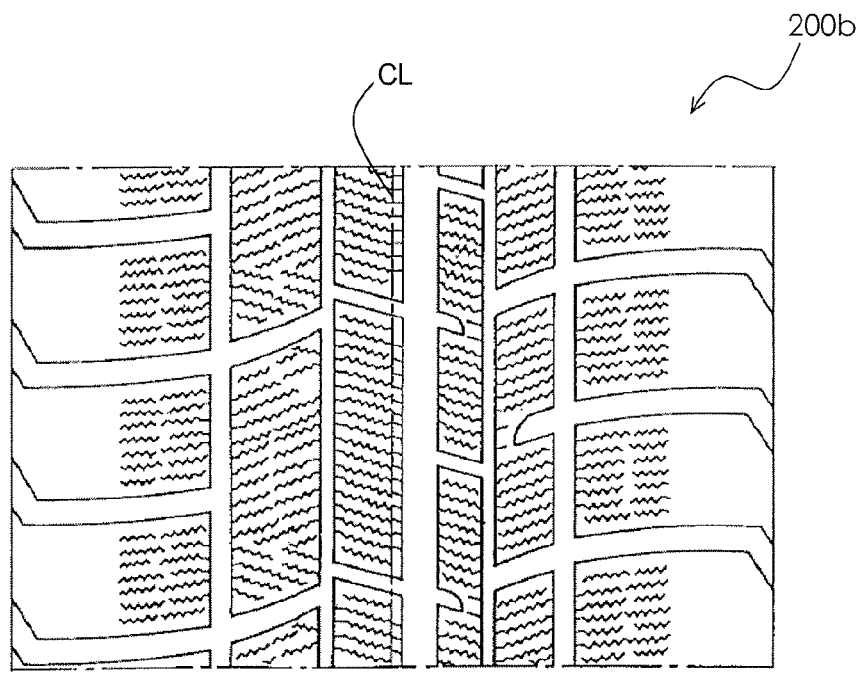
FIG. 11 is a detailed view showing a tread pattern of a test tire (Comparative Example 2)

For comparison, tires of Comparative Examples 1, 2 each having a tread pattern similar to that in FIG. 3 were prepared. Specifically, the tire 200a of Comparative Example 1 had a tread pattern shown in FIG. 10, and had the same configuration as Example 1 except that, instead of providing the closed grooves 23a to 23c in each of blocks 21, lateral grooves laterally crossing the blocks 21 were provided and the blocks 21 were divided into smaller pieces in the tire circumferential direction. The tire 200b of Comparative Example 2 had a tread pattern shown in FIG. 11, and had the same configuration as Example 1 except that the closed grooves 23a to 23c were eliminated from blocks 21.

These test tires were evaluated for braking performance on snow, driving stability on snow, driving stability on wet surface, and braking performance on ice by performing the evaluation methods described below. The results of evaluations are shown in Table 1.

Braking Performance on Snow:

Each of the test tires was fitted onto a wheel having a rim size of 16×7J, inflated to an air pressure of 230 kPa, and mounted on a test vehicle. Braking was performed to stop the vehicle traveling at a speed of 40 km/h on snow, and a braking distance until the vehicle came to a complete stop was measured. The evaluation results are shown by indexes using inverses of measured values where the result of Comparative Example 1 is 100. A larger index means a better braking performance on snow.

Driving Stability on Snow:

Each of the test tires was fitted onto a wheel having a rim size of 16×7J, inflated to an air pressure of 230 kPa, and mounted on a test vehicle. Then, a sensory test was performed on snow by a test driver. The evaluation results are shown by indexes where the result of Comparative Example 1 is 100. A larger index means a better driving stability on snow.

Driving Stability on Wet Road Surface:

Each of the test tires was fitted onto a wheel having a rim size of 16×7J, inflated to an air pressure of 230 kPa, and mounted on a test vehicle. Then, a sensory test was performed on a wet road surface by a test driver. The evaluation results are shown by indexes where the result of Comparative Example 1 is 100. A larger index means a better driving stability on a wet road surface.

Braking Performance on Ice:

Each of the test tires was fitted onto a wheel having a rim size of 16×7J, inflated to an air pressure of 230 kPa, and mounted on a test vehicle. Braking was performed to stop the vehicle traveling at a speed of 40 km/h on ice, and a braking distance until the vehicle came to a complete stop was measured. The evaluation results are shown by indexes using inverses of measured values where the result of Comparative Example 1 is 100. A larger index means a better braking performance on ice.

TABLE 1

|  | Comparative Example 1 | Comparative Example 2 | Example 1 | Example 2 |
|---|---|---|---|---|
| Tread pattern | Asymmetrical (FIG. 10) | Asymmetrical (FIG. 11) | Symmetrical (FIG. 3) | Symmetrical (FIG. 8) |
| Three closed grooves | Absent (lateral groves were employed instead) | Absent | Present | Present |
| Communication between first closed groves and lateral grooves in shoulder | — | — | Present | Absent |
| Braking Performance on Snow | 100 | 95 | 105 | 105 |
| Driving Stability on Snow | 100 | 95 | 105 | 100 |
| Driving stability on wet road surface | 100 | 95 | 105 | 100 |
| Braking performance on ice | 100 | 105 | 105 | 105 |

As is apparent from Table 1, the tires of Examples 1, 2 had an excellent braking performance on snow and on ice compared to Comparative Example 1 in which the blocks were divided into smaller pieces by the lateral grooves. Particularly, the tire of Example 1 was improved in driving stability on snow and on wet road surface. Meanwhile, the tire of Comparative Example 2 had a poor braking performance on snow and a poor driving stability on snow and on wet road surface since the tire had no closed groove.

Next, pneumatic tires of Examples 3, 4 with the following configuration were prepared. Each pneumatic tire had a tire size of 215/60R16. A tread portion of each pneumatic tire was provided with multiple longitudinal grooves extending in a tire circumferential direction and multiple lateral grooves extending in a tire width direction, and the longitudinal grooves and the lateral grooves defined multiple block rows including multiple blocks. In each of the multiple blocks included in a block row located between a block row in a tire shoulder and a block row on a tire equator, three closed grooves including one first closed groove and two second closed grooves were provided. Here, one end of the first closed groove was opened to a longitudinal groove which was adjacent to the block and located on the shoulder side, and the other end was closed in the block. Moreover, one end of each of the second closed grooves was opened to a longitudinal groove which was adjacent to the block and located on a tire equator side, and the other end was closed in the block. In each of the blocks provided with these closed grooves, inclined angles of the closed grooves with respect to the tire width direction were set such that there were two types of angles.

Figure 9:
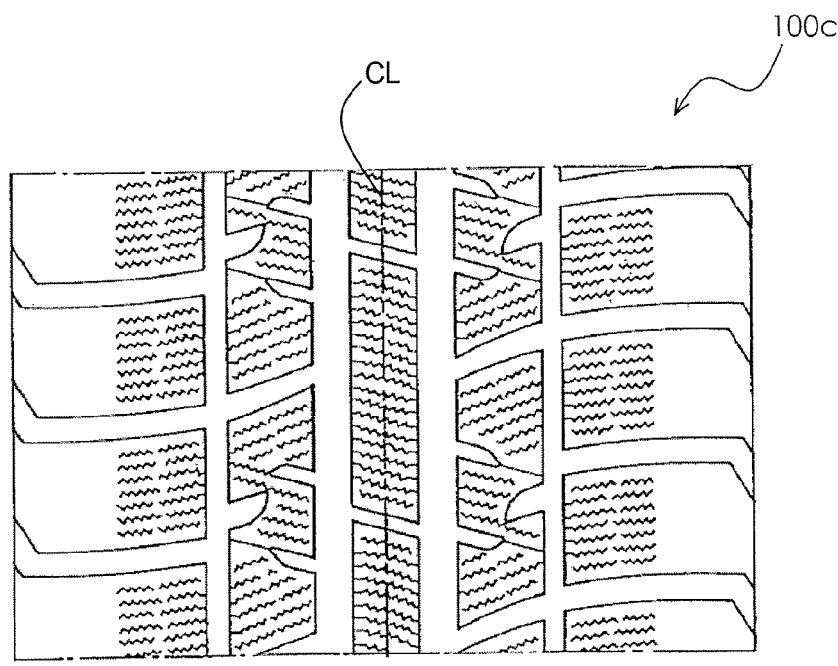
FIG. 9 is a detailed view showing a tread pattern of a test tire (Example 4)

The tire of Example 3 had the tread pattern shown in FIG. 7 where an inclined angle θa of the first closed groove 23a was −17°, and inclined angles θb, θc of the second closed grooves 23b, 23c were +15°. The tire 100c of Example 4 had a tread pattern shown in FIG. 9, and had the same configuration as Example 3 except that first closed grooves 23a were disposed at positions offset in the tire circumferential direction from lateral grooves 2a defining blocks 11 in a block row 10 in the tire shoulder.

Figure 12:
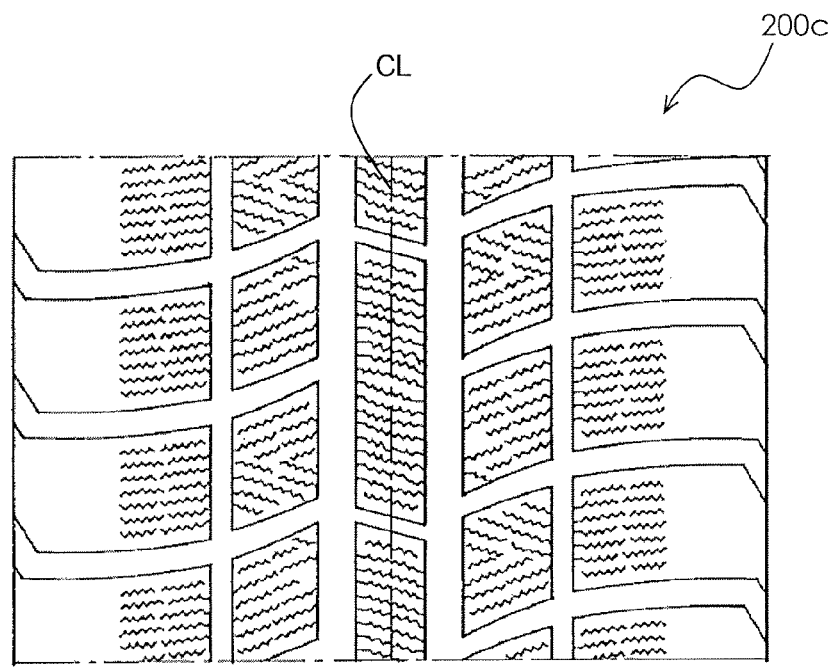
FIG. 12 is a detailed view showing a tread pattern of a test tire (Comparative Example 3)
Figure 13:
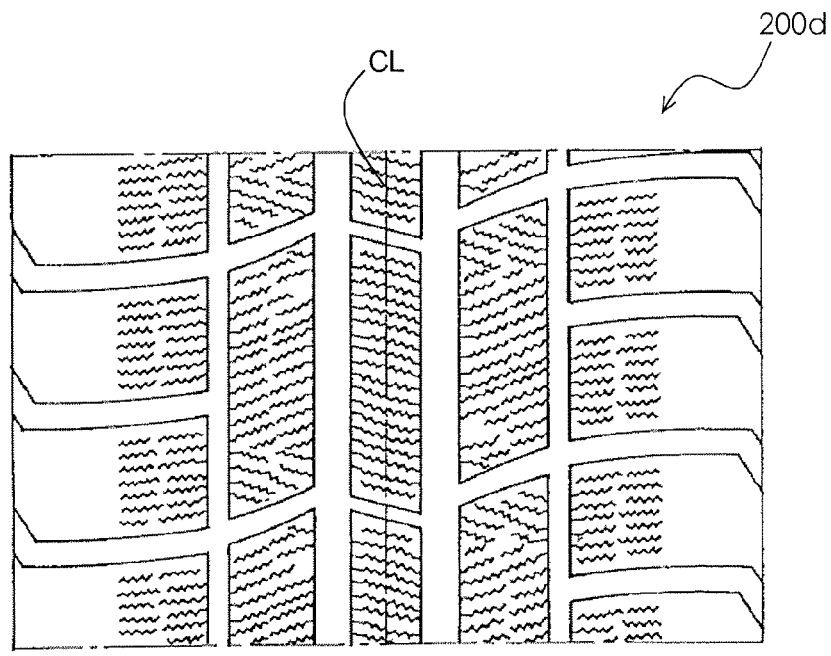
FIG. 13 is a detailed view showing a tread pattern of a test tire (Comparative Example 4)
Figure 14:
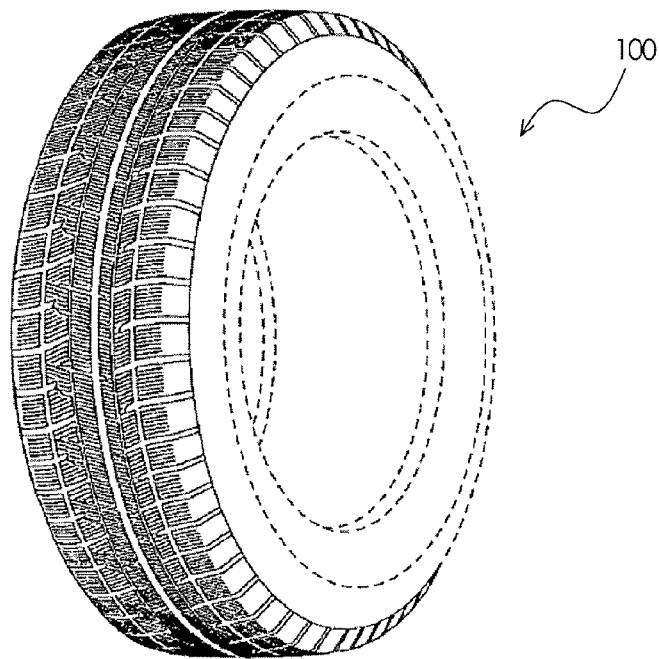
FIG. 14 is a perspective view showing an ornamental design of a pneumatic tire of a disclosed embodiment with parts of the sidewall portions and bead portions being indicated by broken lines.
Figure 15:
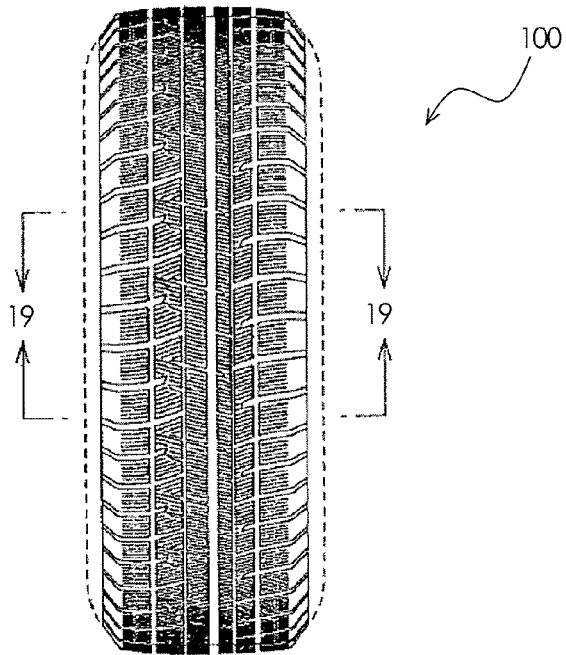
FIG. 15 is a front view of the ornamental design of the pneumatic tire shown in FIG. 14, with a top plan view and bottom plan view of the pneumatic tire appearing the same as the front view.
Figure 16:
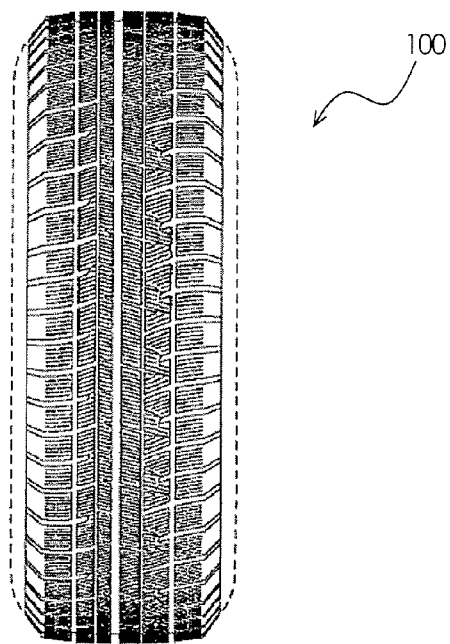
FIG. 16 is a rear view of the ornamental design of the pneumatic tire shown in FIG. 14.
Figure 17:
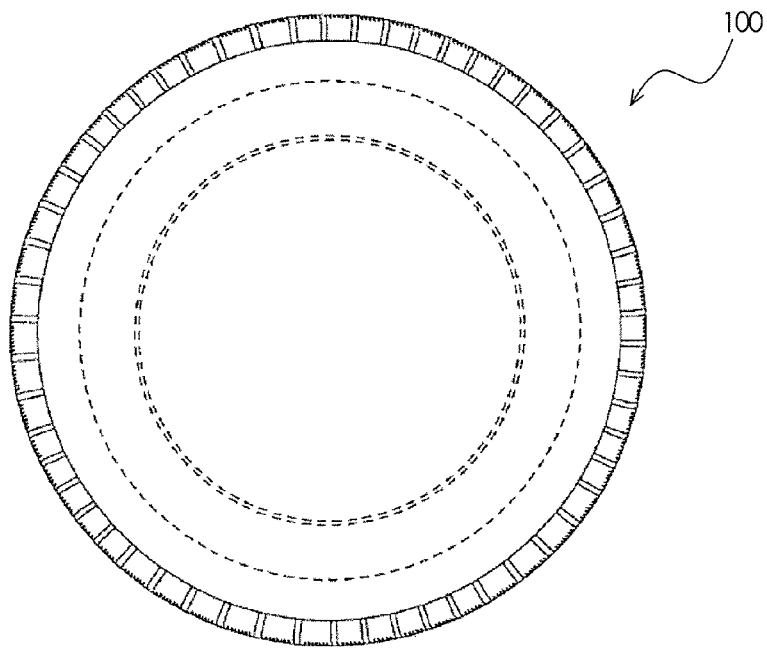
FIG. 17 is a right side view of the ornamental design of the pneumatic tire shown in FIG. 14.
Figure 18:
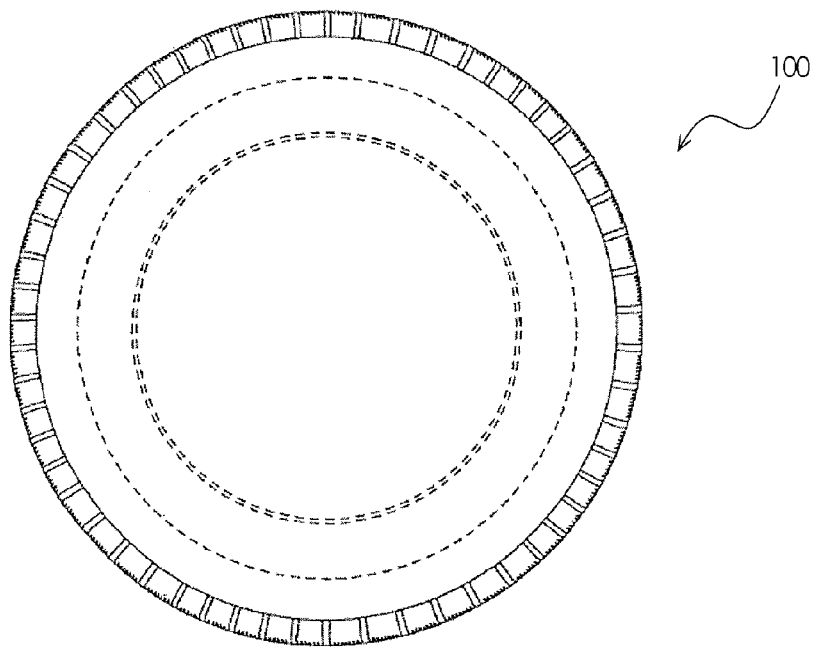
FIG. 18 is a left side view of the ornamental design of the pneumatic tire shown in FIG. 14.
Figure 19:
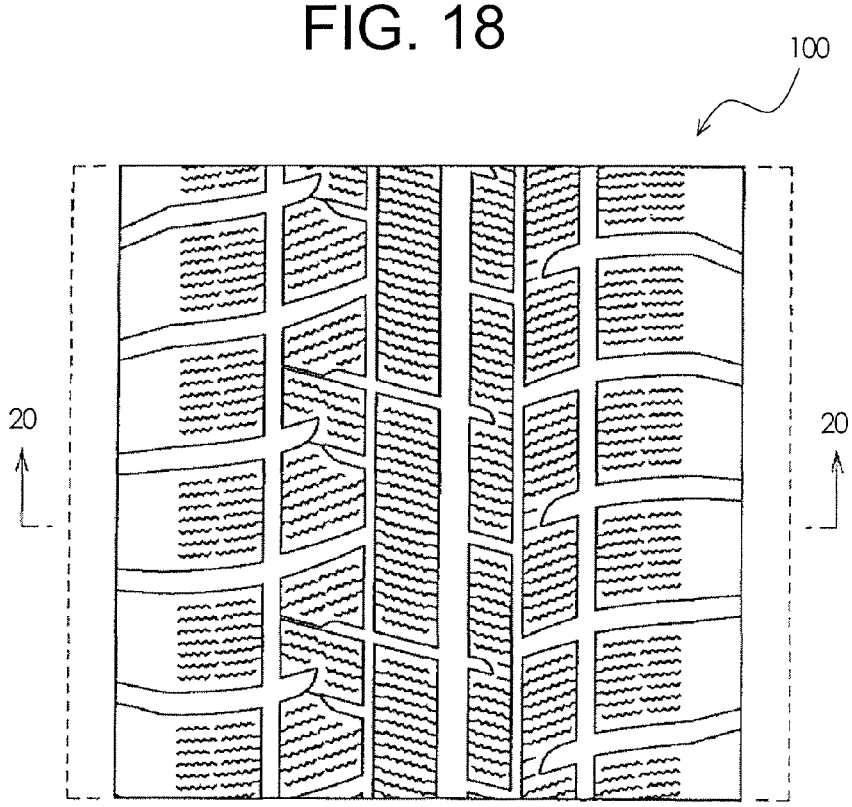
FIG. 19 is partial front view of the ornamental design of the pneumatic tire shown in FIG. 14, showing an enlargement of the portion 19-19 in FIG. 15.

For comparison, tires of Comparative Examples 3, 4 each having a tread pattern similar to that in FIG. 7 were prepared. Specifically, the tire 200c of Comparative Example 3 had a tread pattern shown in FIG. 12, and had the same configuration as Example 3 except that, instead of providing the closed grooves 23a to 23c in each of blocks 21, lateral grooves laterally crossing the blocks 21 were provided and the blocks 21 were divided into smaller pieces in the tire circumferential direction. The tire 200d of Comparative Example 4 had a tread pattern shown in FIG. 13, and had the same configuration as Example 3 except that the closed grooves 23a to 23c were eliminated from blocks 21.

These test tires were evaluated for braking performance on snow, driving stability on snow, driving stability on wet surface, and braking performance on ice by performing the evaluation methods described above. The results of evaluations are shown in Table 2. Note that, evaluation results of Comparative Example 3 were used as standards for respective evaluation items.

TABLE 2

|  | Comparative Example 3 | Comparative Example 4 | Example 3 | Example 4 |
|---|---|---|---|---|
| Tread pattern | Symmetrical (FIG. 12) | Symmetrical (FIG. 13) | Symmetrical (FIG. 7) | Symmetrical (FIG. 9) |
| Three closed grooves | Absent (lateral groves were employed instead) | Absent | Present | Present |
| Communication between first closed groves and lateral grooves in shoulder | — | — | Present | Absent |
| Braking Performance on Snow | 100 | 95 | 105 | 105 |

TABLE 2-continued

| | Comparative Example 3 | Comparative Example 4 | Example 3 | Example 4 |
|---|---|---|---|---|
| Driving Stability on Snow | 100 | 95 | 105 | 100 |
| Driving stability on wet road surface | 100 | 95 | 105 | 100 |
| Braking performance on ice | 100 | 105 | 105 | 105 |

As is apparent from Table 2, the tires of Examples 3, 4 had an excellent braking performance on snow and on ice compared to Comparative Example 3 in which the blocks were divided into smaller pieces by the lateral grooves. Particularly, the tire of Example 3 was improved in driving stability on snow and on wet road surface. Meanwhile, the tire of Comparative Example 4 had a poor braking performance on snow and a poor driving stability on snow and on wet road surface since the tire had no closed groove.

Figure 20:
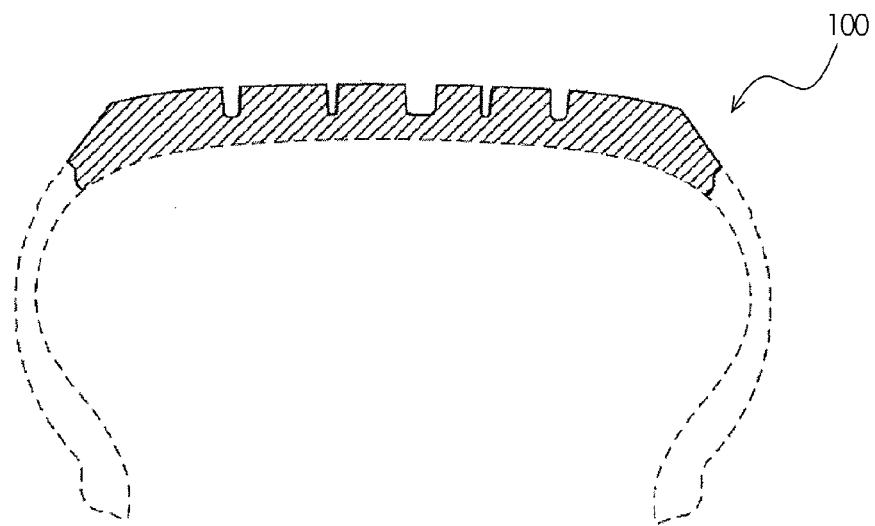
FIG. 20 is a cross-sectional view of the ornamental design of the pneumatic tire of FIG. 14 taken along line 20-20 in FIG. 19.
Figure 21:
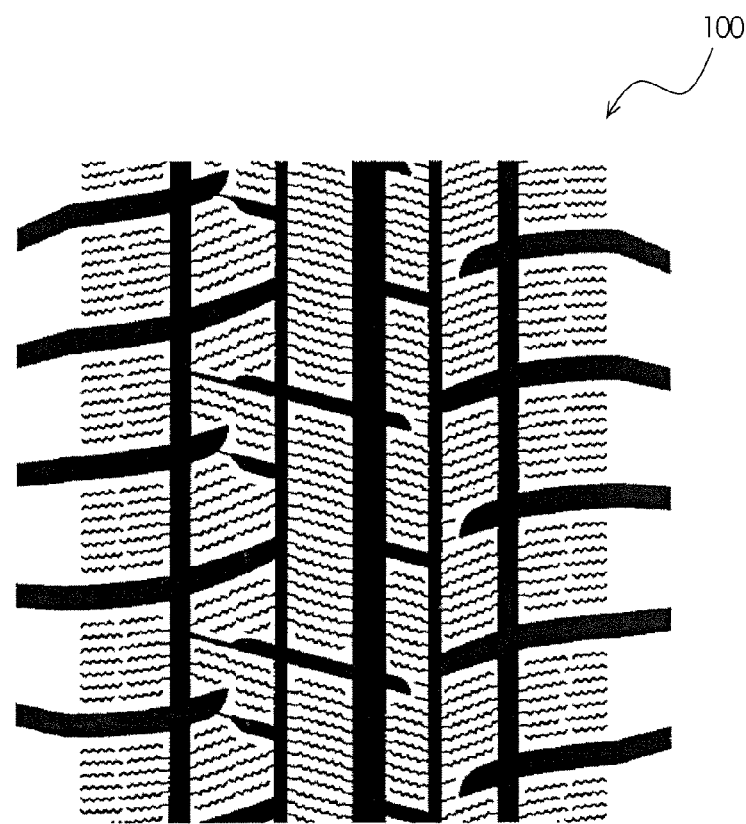
FIG. 21 is a partial front view, corresponding to FIG. 19, of the ornamental design of the pneumatic tire of FIG. 14, but with the grooves colored in black.

In addition, FIGS. 14 to 22 illustrate an ornamental design for the pneumatic tire 100 as described above. The broken line illustration of the environmental structure (the remaining structure of the pneumatic tire 100) in the drawings is not part of the claimed design. Furthermore, in the case of the ornamental design, the sectional view of FIG. 20 is provided to clarify the exact contour or configuration of the exterior surface of the pneumatic tire 100, and no attempt is made to illustrate features of internal construction with respect to the ornamental design.

Figure 22:
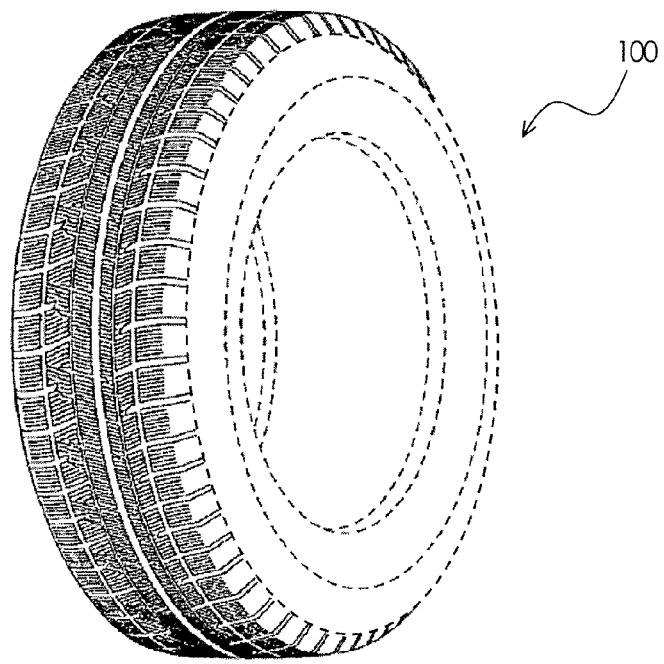
FIG. 22 is a perspective view showing the ornamental design of the pneumatic tire shown in FIG. 14 with a boundary between ornamental design and the sidewall portions being indicated by broken lines.
Figure 23:
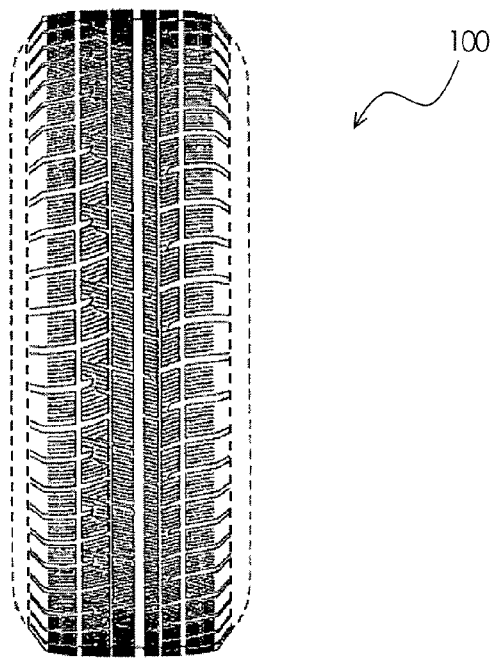
FIG. 23 is a front view of the ornamental design of the pneumatic tire shown in FIG. 22, with a top plan view and bottom plan view of the pneumatic tire appearing the same as the front view.

The alternate design of the pneumatic tire illustrated in FIGS. 22 and 23 are identical to the pneumatic tire illustrated in FIGS. 14 to 21, except that the outer boundaries of the sidewall portions are illustrated in broken lines and do not form part of the claimed design in the alternate design of the pneumatic tire 100 illustrated in FIGS. 22 and 23. In other words, with respect to the alternate design of the pneumatic tire 100 illustrated in FIGS. 22 and 23, it should be understood that the claimed design does not include the boundaries shown in broken lines.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A pneumatic tire comprising:
a tread portion extending in a tire circumferential direction and forming a ring shape;
a pair of sidewall portions disposed on both sides of the tread portion, respectively, with regard to a tire width direction; and
a pair of bead portions disposed on inner sides of the sidewall portions in a tire radial direction, respectively;
the tread portion including a plurality of longitudinal grooves extending in the tire circumferential direction and a plurality of lateral grooves extending in the tire width direction, the longitudinal grooves and the lateral grooves defining a plurality of block rows, each of the block rows including a plurality of blocks,
each of the blocks included in at least one of the block rows being provided with at least three closed grooves including at least one first closed groove and at least one second closed groove, each of the first closed grooves having one end opened to one of the longitudinal grooves adjacent to the block and having the other end closed in the block, and each of the second closed grooves having one end opened to the other one of the longitudinal grooves adjacent to the block and having the other end closed in the block, and the closed grooves being arranged at inclined angles with respect to the tire width direction such that at least two of the inclined angles are different from each other in each of the blocks provided with the closed grooves,
the tread portion including an asymmetrical tread pattern including the plurality of longitudinal grooves, the plurality of lateral grooves, the plurality of block rows and the at least three closed grooves, such that the tire is configured to mount to a vehicle with a particular one of the sidewall portions facing outwardly of the vehicle, and
the closed grooves being provided in each of a plurality of blocks included in a block row located toward an inner side of the vehicle relative to the block row on a tire equator.

2. The pneumatic tire according to claim 1, wherein
the inclined angle of the first closed groove and the inclined angle of the second closed groove with respect to the tire width direction are different from each other in each of the blocks provided with the closed grooves.

3. The pneumatic tire according to claim 2, wherein
the closed grooves are provided in each of a plurality of blocks included in a block row located between a block row in a tire shoulder and a block row on a tire equator among the block rows;
at least one groove being the first closed groove is disposed on a shoulder side in each of the blocks provided with the closed grooves; and
at least two grooves each being the second closed groove are disposed on a tire equator side in each of the blocks provided with the closed grooves.

4. The pneumatic tire according to claim 3, wherein
the inclined angles of the second closed grooves vary with respect to the tire width direction within a variation range of 10° or less.

5. The pneumatic tire according to claim 2, wherein
the first closed groove and the second closed groove in each of the blocks provided with the closed grooves form an intersecting angle within a range of 110° or more and 170° or less.

6. The pneumatic tire according to claim 1, wherein
the closed grooves are provided in each of a plurality of blocks included in a block row adjacent to a block row in a tire shoulder among the block rows; and
at least one of the closed grooves is disposed at such a position that the closed groove communicates with one of the lateral grooves defining the blocks of the block row in the tire shoulder.

7. The pneumatic tire according to claim 1, wherein
the closed grooves are provided in each of a plurality of blocks included in a block row adjacent to a block row on a tire equator among the block rows; and
at least one of the closed grooves is disposed at such a position that the closed groove communicates with one of the lateral grooves defining the blocks of the block row on a tire equator.

8. The pneumatic tire according to claim 1, wherein
each of the blocks included in the block rows includes a plurality of sipes extending in the tire width direction.

9. The pneumatic tire according to claim 8, wherein
each of the blocks provided with the closed grooves is sectioned into at least three regions in the tire circumferential direction, such that inclined angles of the sipes with respect to the tire width direction are alternately different for the respective regions.

10. The pneumatic tire according to claim 3, wherein
the first closed groove and the second closed groove in each of the blocks provided with the closed grooves form an intersecting angle within a range of 110° or more and 170° or less.

11. The pneumatic tire according to claim 2, wherein
the closed grooves are provided in each of a plurality of blocks included in a block row adjacent to a block row in a tire shoulder among the block rows; and
at least one of the closed grooves is disposed at such a position that the closed groove communicates with one of the lateral grooves defining the blocks of the block row in the tire shoulder.

12. The pneumatic tire according to claim 2, wherein
the closed grooves are provided in each of a plurality of blocks included in a block row adjacent to a block row on a tire equator among the block rows; and
at least one of the closed grooves is disposed at such a position that the closed groove communicates with one of the lateral grooves defining the blocks of the block row on a tire equator.

13. The pneumatic tire according to claim 2, wherein
each of the blocks included in the block rows includes a plurality of sipes extending in the tire width direction.

14. The pneumatic tire according to claim 2, wherein
a block pitch of the block row located closer to a tire equator than the block row in each of tire shoulders of the tire is twice as large as a block pitch of the block rows in the tire shoulders.

15. The pneumatic tire according to claim 4, wherein
the first closed groove and the second closed groove in each of the blocks provided with the closed grooves form an intersecting angle within a range of 110° or more and 170° or less.

16. The pneumatic tire according to claim 3, wherein
the closed grooves are provided in each of a plurality of blocks included in a block row adjacent to a block row in a tire shoulder among the block rows; and
at least one of the closed grooves is disposed at such a position that the closed groove communicates with one of the lateral grooves defining the blocks of the block row in the tire shoulder.

17. The pneumatic tire according to claim 3, wherein
the closed grooves are provided in each of a plurality of blocks included in a block row adjacent to a block row on a tire equator among the block rows; and
at least one of the closed grooves is disposed at such a position that the closed groove communicates with one of the lateral grooves defining the blocks of the block row on a tire equator.

18. A pneumatic tire comprising:
a tread portion extending in a tire circumferential direction and forming a ring shape;
a pair of sidewall portions disposed on both sides of the tread portion, respectively, with regard to a tire width direction; and
a pair of bead portions disposed on inner sides of the sidewall portions in a tire radial direction, respectively;
the tread portion including a plurality of longitudinal grooves extending in the tire circumferential direction and a plurality of lateral grooves extending in the tire width direction, the longitudinal grooves and the lateral grooves defining a plurality of block rows, each of the block rows including a plurality of blocks,
each of the blocks included in at least one of the block rows being provided with at least three closed grooves including at least one first closed groove and at least one second closed groove, each of the first closed grooves having one end opened to one of the longitudinal grooves adjacent to the block and having the other end closed in the block, and each of the second closed grooves having one end opened to the other one of the longitudinal grooves adjacent to the block and having the other end closed in the block, and the closed grooves being arranged at inclined angles with respect to the tire width direction such that at least two of the inclined angles are different from each other in each of the blocks provided with the closed grooves,
each of the blocks included in the block rows includes a plurality of sipes extending in the tire width direction,
each of the blocks provided with the closed grooves is sectioned into at least three regions in the tire circumferential direction, such that inclined angles of the sipes with respect to the tire width direction are alternately different for the respective regions,
a difference between an inclined angle of the sipes with respect to the tire width direction and an inclined angle of the lateral grooves defining the block with respect to the tire width direction is 10° or less in regions at both ends of each of the blocks provided with the closed grooves in the tire circumferential direction; and
a difference between an inclined angle of the sipes with respect to the tire width direction and an inclined angle of the closed groove with respect to the tire width direction is 10° or less in a center region of each of the blocks provided with the closed grooves in the tire circumferential direction, with the closed groove inclined in a direction opposite to the inclination of the lateral grooves defining the block.

19. A pneumatic tire comprising:
a tread portion extending in a tire circumferential direction and forming a ring shape;
a pair of sidewall portions disposed on both sides of the tread portion, respectively, with regard to a tire width direction; and
a pair of bead portions disposed on inner sides of the sidewall portions in a tire radial direction, respectively;
the tread portion including a plurality of longitudinal grooves extending in the tire circumferential direction and a plurality of lateral grooves extending in the tire width direction, the longitudinal grooves and the lateral grooves defining a plurality of block rows, each of the block rows including a plurality of blocks, each of the blocks included in at least one of the block rows being provided with at least three closed grooves including at least one first closed groove and at least one second closed groove, each of the first closed grooves having one end opened to one of the longitudinal grooves adjacent to the block and having the other end closed in the block, and each of the second closed grooves having one end opened to the other one of the longitudinal grooves adjacent to the block and having the other end closed in the block, and the closed grooves being arranged at inclined angles with respect to the tire width direction such that at least two of the inclined angles are different from each other in each of the blocks provided with the closed grooves, and a block pitch of the block row located closer to a tire equator than the block row in each of tire shoulders of the tire is twice as large as a block pitch of the block rows in the tire shoulders.

* * * * *